United States Patent
De Cesare et al.

(10) Patent No.: US 11,536,189 B2
(45) Date of Patent: Dec. 27, 2022

(54) FUEL INJECTION SYSTEM FOR A SPARK-IGNITION INTERNAL COMBUSTION ENGINE AND RELATIVE CONTROL METHOD

(71) Applicant: MARELLI EUROPE S.p.A., Corbetta (IT)

(72) Inventors: Matteo De Cesare, Torremaggiore (IT); Federico Stola, Bologna (IT)

(73) Assignee: MARELLI EUROPE S.p.A., Corbetta (IT)

(*) Notice: Subject to any disclaimer, the term of this patent is extended or adjusted under 35 U.S.C. 154(b) by 7 days.

(21) Appl. No.: 17/202,420

(22) Filed: Mar. 16, 2021

(65) Prior Publication Data

US 2021/0324784 A1    Oct. 21, 2021

(30) Foreign Application Priority Data

Mar. 17, 2020  (IT) .................. 102020000005683

(51) Int. Cl.
*F02B 19/10* (2006.01)
*F02B 19/12* (2006.01)

(52) U.S. Cl.
CPC .......... *F02B 19/1085* (2013.01); *F02B 19/12* (2013.01)

(58) Field of Classification Search
CPC .. F02B 19/1085; F02B 19/12; F02B 19/1023; F02B 19/108; F02B 19/109; Y02T 10/12; F02M 26/35; F02M 26/41; F02M 26/37
See application file for complete search history.

(56) References Cited

U.S. PATENT DOCUMENTS

| | | | |
|---|---|---|---|
| 2017/0335748 A1* | 11/2017 | Zhang | F02D 41/26 |
| 2018/0003132 A1* | 1/2018 | Ginter | F02M 27/04 |
| 2020/0200068 A1* | 6/2020 | Schock | F02D 41/0007 |

FOREIGN PATENT DOCUMENTS

| | | |
|---|---|---|
| DE | 102015221286 A1 | 5/2017 |
| DE | 102017111027 A1 | 11/2017 |

OTHER PUBLICATIONS

Search Report for Italian Patent Application No. 202000005683 dated Sep. 7, 2020.

* cited by examiner

*Primary Examiner* — Xiao En Mo
(74) *Attorney, Agent, or Firm* — Howard & Howard Attorneys PLLC

(57) ABSTRACT

A fuel injection system for a spark-ignition internal combustion engine having a number of cylinders, where a plurality of respective main combustion chambers are defined; a number of first injectors and spark plugs coupled to the cylinders; a number of combustion pre-chambers, each obtained in the area of a respective spark plug; a number of extraction ducts, which originate from a respective cylinder to extract the gas mixture present inside the respective main combustion chamber; a reserve, where the gases extracted by the extraction ducts are mixed with the quantity of fuel needed to obtain a combustion under stoichiometric conditions inside the combustion pre-chambers; and a number of second injectors, each coupled to a respective combustion pre-chamber, into which it injects the gas-and-fuel mixture coming from the reserve.

16 Claims, 5 Drawing Sheets

FUEL INJECTION SYSTEM FOR A SPARK-IGNITION INTERNAL COMBUSTION ENGINE AND RELATIVE CONTROL METHOD

CROSS-REFERENCE TO RELATED APPLICATIONS

This patent application claims priority from Italian patent application no. 102020000005683 filed on Mar. 17, 2020, the entire disclosure of which is incorporated herein by reference.

TECHNICAL FIELD

The invention relates to a fuel injection system for a spark-ignition internal combustion engine and to a relative control method.

PRIOR ART

As it is known, a fuel injection system for a spark-ignition internal combustion engine is generally provided with a plurality of injectors, with a common rail, which feeds fuel under pressure to the injectors, with a high-pressure pump, which feeds fuel to the common rail by means of a feeding duct, and with a low-pressure pump, which feeds fuel from a tank to the high-pressure pump by means of a feeding duct.

The spark-ignition internal combustion engine further comprises a number of cylinders, each housing a respective piston, which is mechanically connected, by means of a connecting rod, to a crankshaft so as to transmit the force generated by the combustion inside the cylinder to the crankshaft itself.

Furthermore, the engine comprises a spark plug for each cylinder in order to cyclically determine the ignition of the gas mixture present inside the cylinders. In particular, each spark plug is cyclically activated in order to determine the ignition of compressed gases inside a main combustion chamber defined inside the cylinder at the end of each compression stroke of the combustion cycle of the cylinder.

For each cylinder, the corresponding injector is provided; alternatively, the injection can be an indirect injection and, therefore, each injector is arranged upstream of the cylinder in an intake duct or the injection can be a direct injection and, therefore, each injector is partially arranged inside the cylinder.

Furthermore, the use of injection system is known, wherein a combustion is carried out under stoichiometric conditions inside a combustion pre-chamber (or auxiliary combustion chamber) defined close to each spark plug; a given quantity of fuel and air is injected into the combustion pre-chamber and the ignition of the fuel (in a percentage amounting to approximately 2-3% of the total fuel injected) present in the gas mixture inside the combustion pre-chamber allows the combustion inside the main combustion chamber, which is arranged downstream in the respective cylinder, to be more efficient.

Fresh air is supplied to the combustion pre-chamber by the main combustion chamber through holes (so-called passive combustion pre-chamber) obtained in the area of the top of the combustion pre-chamber. Alternatively, in system with a so-called active combustion pre-chamber, besides the air coming from the main combustion chamber it is also possible to supply an air-fuel mixture. Typically, the combustion pre-chamber receives fresh air (namely, air coming from the outside) for the preparation of said air-fuel mixture upstream of the injector, by means of a duct along which there is housed a preferably electric compressor device.

Document DE 10 2015 221286 A1 discloses an example of a fuel injection system for a spark-ignition internal combustion engine of the type described so far.

Known compressor devices used to supply air to the combustion pre-chambers, however, are not capable of ensuring a supply solely taking place at pressures in the range of 6-7 bar.

DESCRIPTION OF THE INVENTION

The object of the invention is to provide a fuel injection system for a spark-ignition internal combustion engine, said fuel injection system not suffering from the drawbacks described above and, in particular, being easy and economic to be manufactured.

A further the object of the invention is to provide a method to control a fuel injection system for a spark-ignition internal combustion engine, said method not suffering from the drawbacks described above and, in particular, being easy and economic to be implemented.

According to the invention, there are provided a fuel injection system for a spark-ignition internal combustion engine and a relative control method according to the appended claims.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
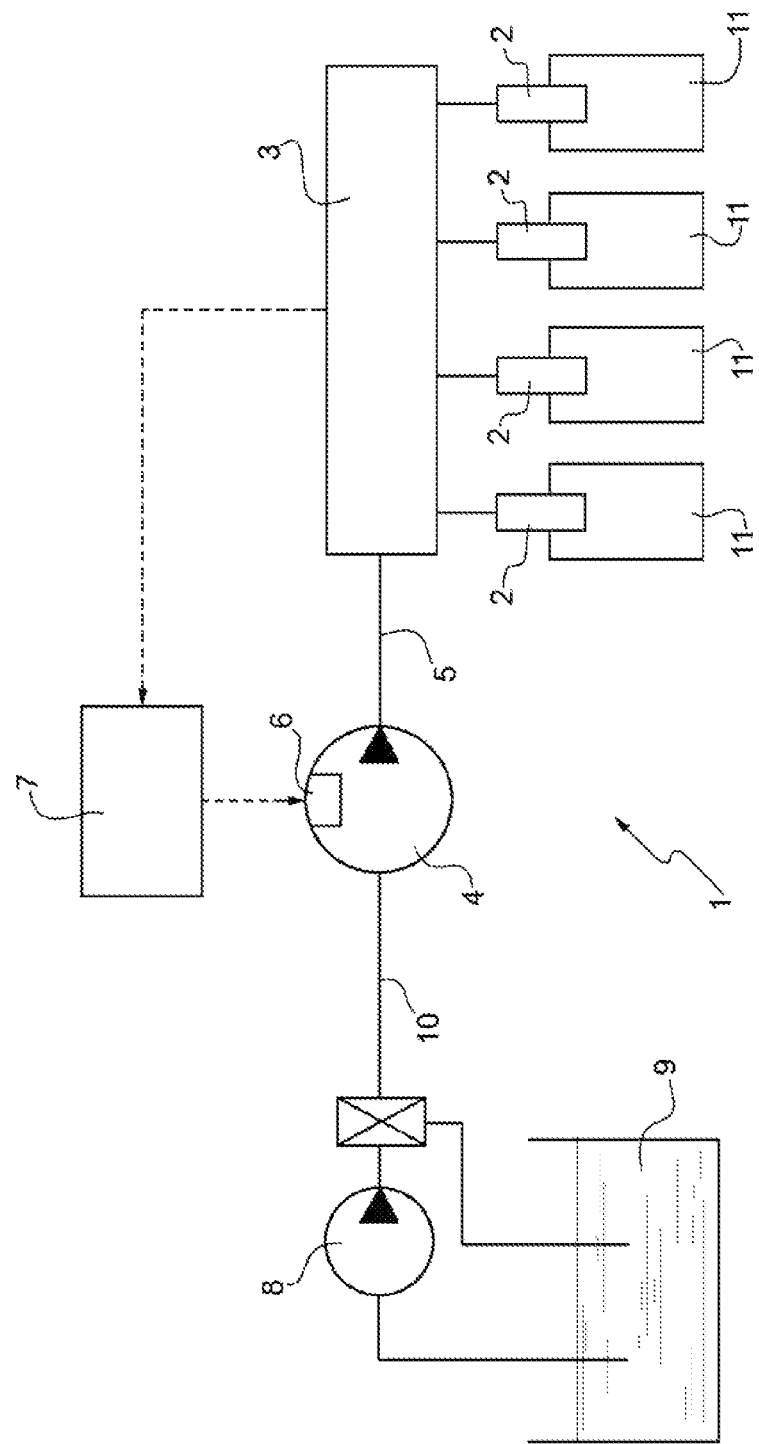
FIG. 1 is a schematic view, with some details removed for greater clarity, of a spark-ignition internal combustion engine.

In FIG. 1, number 1 indicates, as a whole, a fuel injection system for a spark-ignition internal combustion engine.

The injection system 1 comprises a plurality of injectors 2, a common rail 3, which feeds fuel under pressure to the injectors 2, a high-pressure pump 4, which feeds fuel to the common rail 3 by means of a feeding duct 5 and is provided with a flow rate adjusting device 6, an electronic control unit 7, which causes the fuel pressure inside the common rail 3 to reach a desired value, which generally varies in time depending on the engine operating conditions, and a low-pressure pump 8, which feeds fuel from a tank 9 to the high-pressure pump 4 by means of a feeding duct 10.

The electronic control unit 7 is coupled to the flow rate adjusting device 6 so as to control the flow rate of the high-pressure pump 4 in order to feed to the common rail 3, instant by instant, the quantity of fuel needed to have the desired pressure value inside the common rail 3.

The spark-ignition internal combustion engine further comprises a number of (in particular, four) cylinders 11, preferably arranged in line. Each cylinder 11 houses a respective piston 12, which is mechanically connected, by means of a connecting rod, to a crankshaft in order to transmit the force generated by the combustion inside the cylinder 11 to the crankshaft itself.

Furthermore, in case of a spark-ignition engine, four spark plugs 13 (one for each cylinder 11) are coupled to the cylinders 11 so as to cyclically determine the ignition of the gas mixture present inside the cylinders 11. Each spark plug 13 is cyclically activated in order to determine the ignition of compressed gases inside a main combustion chamber MC defined inside the cylinder 11 at the end of each compression stroke of the combustion cycle of the cylinder 11.

Figure 2:
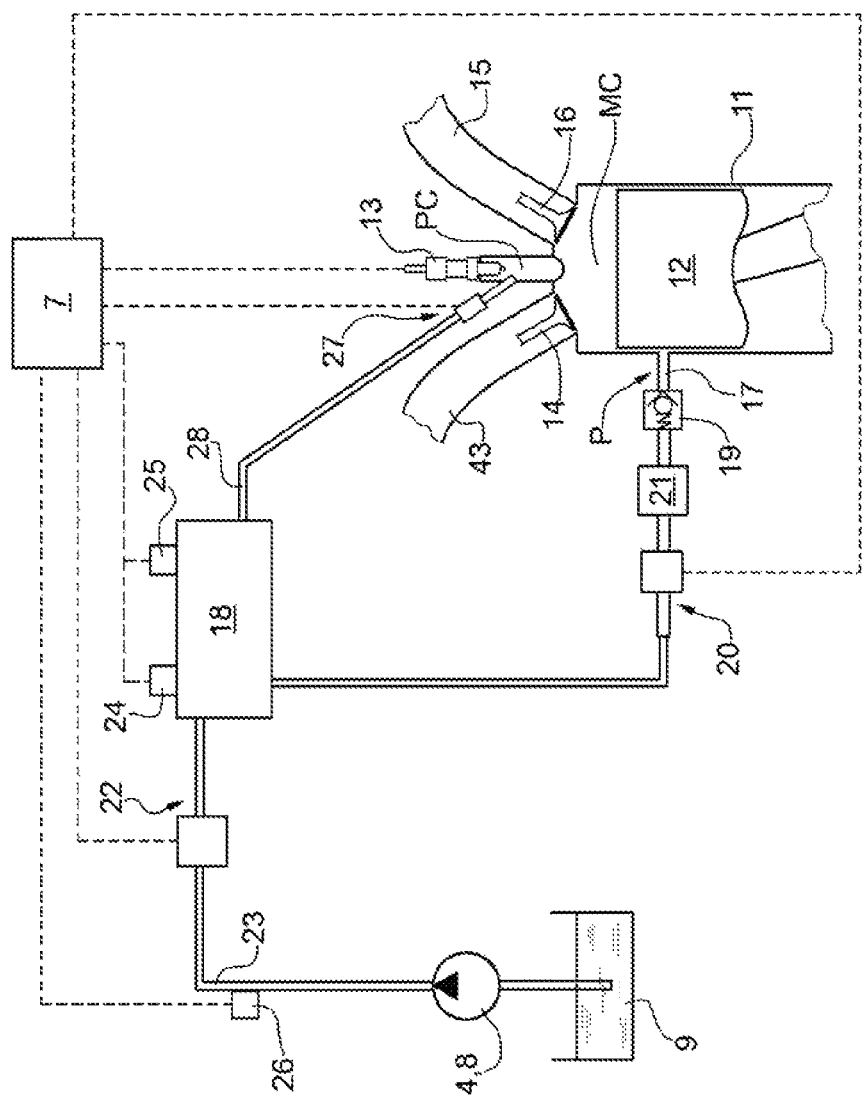
FIG. 2 is a schematic view of a first embodiment of a fuel injection system for the internal combustion engine of FIG. 1 according to the invention.

According to FIG. 2, an intake manifold 43 is connected to each cylinder 11 by means of two intake valves (only one of them being shown in FIG. 2), from which it receives a gas mixture comprising fresh air (namely, air coming from the outside) and, if necessary, EGR. Furthermore, the internal combustion engine comprises an exhaust manifold 15, which is connected to each cylinder 11 by means of two exhaust valves 16 (only one of them being shown in FIG. 2) and leads into an emission duct (not shown) to release the gases produced by the combustion into the atmosphere.

As it is known, a complete combustion cycle is the result of a succession of four strokes, at the end of which two revolutions of the crankshaft have been completed covering a 720° angle. Typically, during the intake stroke and/or the subsequent compression stroke and/or the subsequent expansion stroke, fuel is injected into the combustion chamber of the cylinder 11 and, in the expansion stroke or in the final part of the previous compression stroke, the electrodes of the spark plug 13 generate a spark that ignites the mixture of air and fuel inside the cylinder 11, thus starting the actual combustion, which produces a temperature and pressure increase. Finally, during the exhaust stroke, the movement of the piston 12 allows burnt gases to be expelled through the respective exhaust valve 16 in order to be released into the exhaust manifold 15.

For each cylinder 11, the corresponding injector 2 is provided; alternatively, the injection can be an indirect injection and, therefore, each injector 2 is arranged upstream of the cylinder 11 in an intake duct connecting the intake manifold 43 to the cylinder 11 or the injection can be a direct injection and, therefore, each injector 2 is partially arranged inside the cylinder 11.

Each cylinder 11 is further provided with a respective duct 17, which originates from a side wall of the cylinder 11 in the area of an extraction point P to extract the gas mixture (fresh air and EGR and/or fuel) from the main combustion chamber MC of the respective cylinder 11 and leads up to a common reserve 18 shared by the four cylinders 11 The extraction point P can alternatively be obtained above or under the top dead centre of the stroke of the piston 12. Along the extraction duct 17 there is housed a control valve 19, which is designed to adjust the passage of the gas mixture through the extraction duct 17; the control valve 19 is arranged close to the extraction point P. The control valve 19 is preferably set to a predetermined pressure value (in the range of 4, 5 bar) so as to prevent oil from leaking during the compression stroke and the following expansion stroke of the combustion cycle. Between the control valve 19 and the reserve 18 there is interposed an injector 20 to feed the gas mixture extracted from the main combustion chamber MC of the respective cylinder 11 to the reserve 18. The injection 20 is connected to the electronic control unit 7 and is controlled so as to extract the gas mixture from the main combustion chamber MC of the respective cylinder 11 during the compression stroke of the combustion cycle and feed it to the reserve 18. In particular, the injector 20 is controlled by the electronic control unit 7 so as to extract the gas mixture from the main combustion chamber MC of the respective cylinder 11 when (namely, within a given angular window of the combustion cycle) the pressure inside said main combustion chamber MC is equal to or greater than the injection pressure in the combustion pre-chamber PC. The injection pressure in the combustion pre-chamber PC ranges from 8 to 12 bar; preferably, the injection pressure in the combustion pre-chamber PC is equal to 10 bar.

According to a preferred variant, along the extraction duct 16 there is housed a filter 21, preferably interposed between the injector 20 and the control valve 19 to protect the injector 20.

Furthermore, an injector system 22 is provided, which is suited to supply the reserve 18 with a given quantity of fuel needed to carry out a combustion under stoichiometric conditions inside a combustion pre-chamber PC, as described more in detail below. The injector system 22 is connected, by means of a duct 23, to the low-pressure pump 8 or, alternatively, to the high-pressure pump 4. According to a preferred variant, the reserve 18 is further provided with a temperature and pressure sensor 24, which is connected to the electronic control unit 7, and with a lambda sensor 25 to read the fuel-air equivalence ratio of the gas mixture, which is also connected to the electronic control unit 7.

Each cylinder 11 is further provided with an injector 27 connected to the reserve 18 by means of a respective duct 28; the injector 27 is designed to feed a gas-and-fuel mixture contained in the reserve 18 into a combustion pre-chamber PC (or auxiliary combustion chamber) defined close to the spark plug 13. The ignition of the fuel (in a percentage amounting to approximately 2-3% of the total fuel injected) present in gas mixture injected into the combustion pre-chamber PC allows for an increase in the turbulence inside the main combustion chamber MC of the respective cylinder 11, thus improving the ignition of the fuel injected into the main combustion chamber MC of the respective cylinder 11. In particular, the injector 27 is controlled by the electronic control unit 7 so as to feed the gas-and-fuel mixture contained in the reserve 18 into the combustion pre-chamber PC when (namely, within a given angular window of the combustion cycle) the pressure inside said combustion pre-chamber PC is smaller than the pressure value at which the gas mixture was sucked from the main combustion chamber MC.

Figure 3:
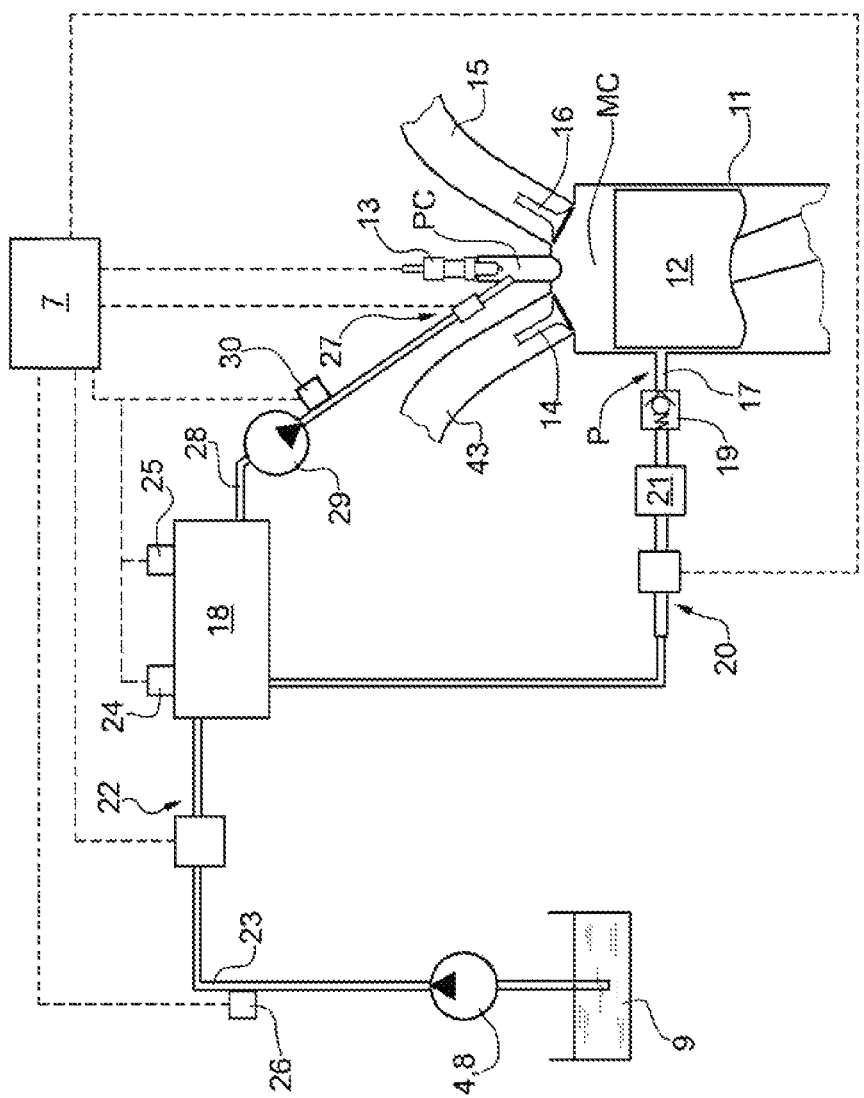
FIG. 3 is a schematic view of a second embodiment of a fuel injection system for the internal combustion engine of FIG. 1 according to the invention.

FIG. 3 differs from FIG. 2 in that the injection system 1 comprises a pumping device 29 housed along the duct 28 upstream of the injector 27. The presence of the pumping device 29 allows for a greater flexibility in the injection into the combustion pre-chamber PC, as it always is possible to control the injector 27 so as to feed the gas-and-fuel mixture contained in the reserve 18 into the combustion pre-chamber PC (namely, within any angular window of the combustion cycle). Furthermore, a gas-and-fuel mixture pressure sensor 30 is provided, which is housed along the duct 28 and is interposed between the pumping device 29 and the injector 27; the sensor 30 is connected to the control unit 7 so as to allow the injection of the gas-and-fuel mixture into the combustion pre-chamber PC to be controlled.

Figure 4:
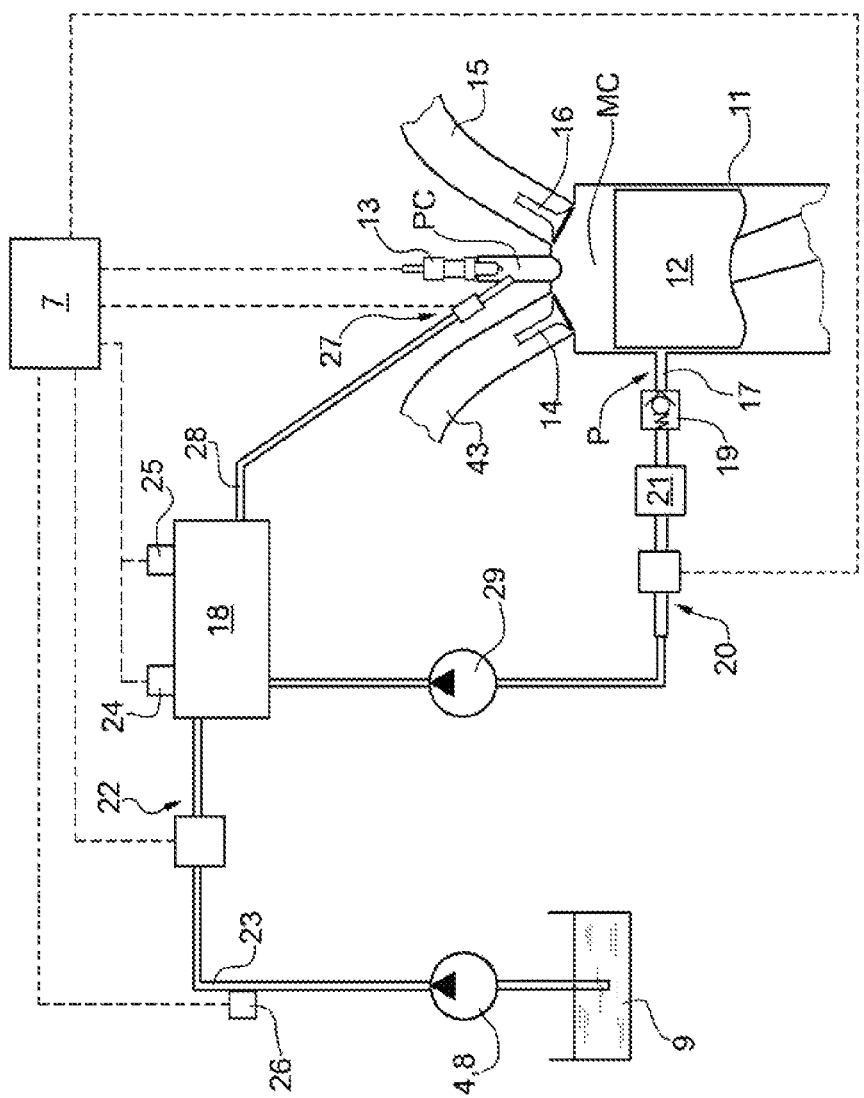
FIG. 4 is a schematic view of a third embodiment of a fuel injection system for the internal combustion engine of FIG. 1 according to the invention.

FIG. 4 differs from FIG. 3 in that the pumping device 29 is housed along the extraction duct 17, upstream of the reserve 18 and downstream of the injector 20. In this case, again, the presence of the pumping device allows for a greater flexibility in the injection into the combustion pre-chamber PC, as it always is possible to control the injector 27 so as to feed the gas and fuel mixture contained in the reserve 18 into the combustion pre-chamber PC (namely, within any angular window of the combustion cycle).

Preferably, one single pumping device 29 is provided, which supplies the reserve 18 with the gas mixture coming from all cylinders 11. Alternatively, there is a pumping device 29 for each cylinder 11, which is suited to supply the reserve 18 with the gas mixture coming from the respective cylinder 11.

Figure 5:
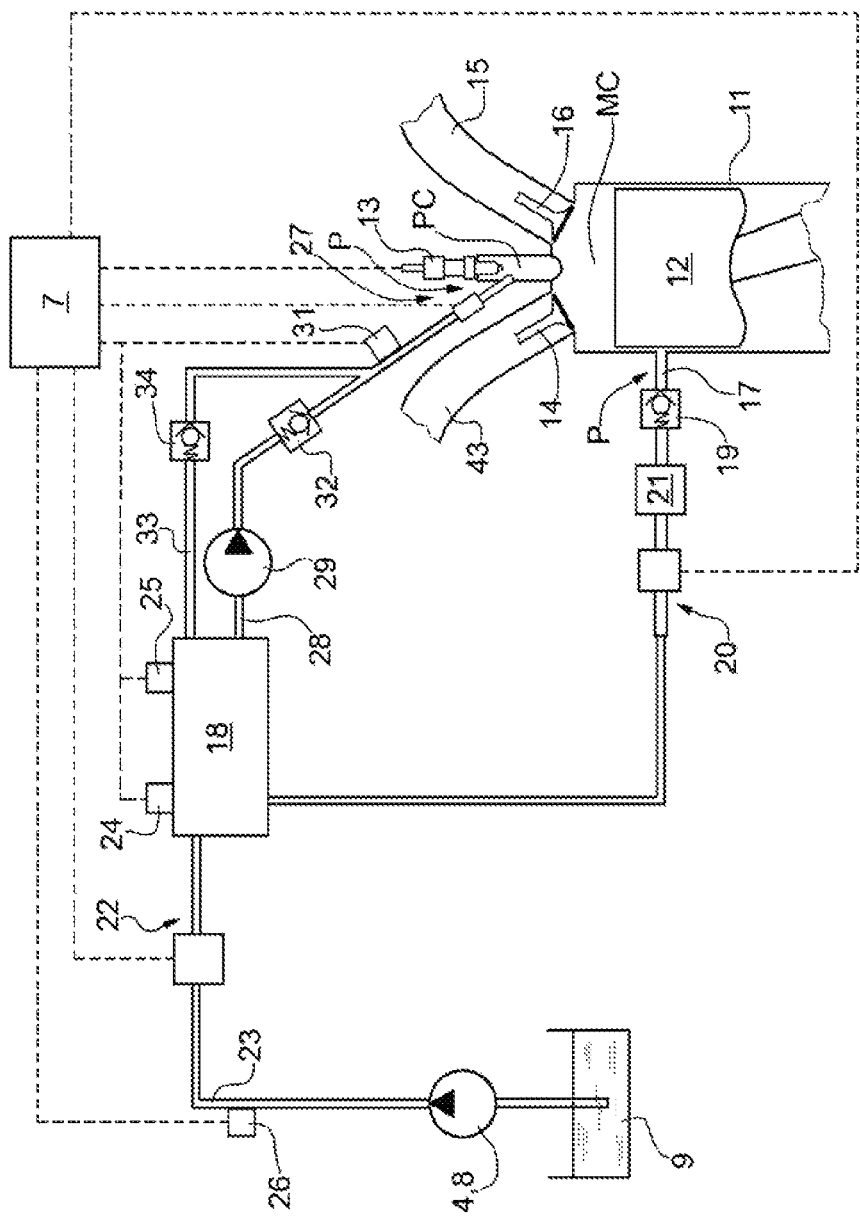
FIG. 5 is a schematic view of a fourth embodiment of a fuel injection system for the internal combustion engine of FIG. 1 according to the invention.

FIG. 5 also differs from FIG. 3 in that the pumping device 29 is housed along the extraction duct 28, upstream of the injector 27. In this case, again, the presence of the pumping device allows for a greater flexibility in the injection into the combustion pre-chamber PC, as it always is possible to control the injector 27 so as to feed the gas and fuel mixture contained in the reserve 18 into the combustion pre-chamber PC (namely, within any angular window of the combustion cycle).

Furthermore, the injection system 1 lacks both the injector 20 and the extraction duct 17. According to this embodiment, the injector 27 is suited both to suck the gas mixture destined to the reserve 18 from the main combustion chamber MC and to feed the gas-and-fuel mixture from the reserve 18 to the combustion pre-chamber PC. Furthermore, a gas-and-fuel mixture pressure sensor 31 is provided, which is housed along the duct 28 and interposed between the pumping device 29 and the injector 27; the pressure sensor 31 is connected to the electronic control unit 7 so as to allow the pressure of the gas-and-fuel mixture to be detected and the injection into the combustion pre-chamber PC to be controlled. Along the duct 28, downstream of the pumping device 29, there is housed a control valve 32, which is designed to adjust the passage of the gas-and-fuel mixture through the duct 28; the control valve 32 is preferably set to a predetermined pressure value (in the range of approximately 22 bar).

Furthermore, a further connection duct 33 is provided, which connects the injector 27 to the reserve 18 and long which a respective control valve 34 is housed, which is designed to adjust the passage of the gas mixture through the duct 33; the control valve 34 is preferably set to a predetermined pressure value (in the range of approximately 12 bar).

The electronic control unit 7 manages the operation of the injection system 1 and, among other things, controls the spark plugs 13 so as to determine the ignition of the compressed gases inside each cylinder 2.

The method to control the injection system 1 is described below, said method comprising an initial suction step to suck the gas mixture from the main combustion chamber MC. The suction step requires the electronic control unit 7 to control the opening of the injector 20 (according to the embodiments shown in FIGS. 2, 3 and 4) or of the injector 27 (according to the embodiment shown in FIG. 5). Clearly, the opening of the injector 20 or of the injector 27 is limited within angular windows of the complete combustion cycle, which are stored in the electronic control unit 7; each angular window is expressed in degrees of engine angle and is associated with the compression stroke of the complete combustion cycle of a cylinder 11. Each angular window is recognized through the signal of the phonic wheel sensor (nor shown) fitted to an end of the crankshaft to detect its speed of rotation. Furthermore, according to the embodiment shown in FIGS. 4 and 5, the electronic control unit 7 controls the pumping device 29 so as to increase the pressure of the gas mixture sucked from the main combustion chamber MC up to the value established for the injection into the combustion pre-chamber PC and depending on the signals detected by the sensors 24, 31.

Subsequent to the suction step, the method to control the injection system 1 comprises a mixing step to mix the gas-and-fuel mixture inside the reserve 18. During the mixing step, the electronic control unit 7 controls the opening of the injector system 22 so as to supply the reserve 18 with a quantity of fuel determined with a feedback (or closed-loop) control carried out through the signal coming from the lambda sensor 25.

Subsequent to the mixing step, the method to control the injection system 1 comprises an injection step to inject the gas-and-fuel mixture into the combustion pre-chamber PC. During the injection step, the electronic control unit 7 controls the opening of the injector 27. The opening of the injector 27 is limited within angular windows of the complete combustion cycle, which are stored in the electronic control unit 7; each angular window is expressed in degrees of engine angle. Furthermore, according to the embodiment shown in FIG. 4, the electronic control unit 7 controls the pumping device 29 so as to increase the pressure of the gas-and-fuel mixture up to the value established for the injection into the combustion pre-chamber PC and depending on the signals detected by the sensors 24, 31.

Finally, subsequent to the injection step, the method to control the injection system 1 comprises an ignition step to ignite the gas-and-fuel mixture inside the combustion pre-chamber PC. During the ignition step, the electronic control unit 7 controls the ignition of the spark plug 13. Clearly, the ignition of the spark plug 13 is limited within angular windows of the complete combustion cycle, which are stored in the electronic control unit 7; each angular window is expressed in degrees of engine angle.

The invention claimed is:

1. A fuel injection system (1) for a spark-ignition internal combustion engine comprising:
   a number of cylinders (11), which receive a gas mixture comprising fresh air and wherein a plurality of respective main combustion chambers (MC) are defined;
   a number of first injectors (2), each coupled to a respective cylinder (11), into which it injects fuel under pressure during a combustion cycle;
   a number of spark plugs (13), each coupled to a respective cylinder (11) to cyclically determine the ignition of the fuel present in the main combustion chamber (MC);
   a number of combustion pre-chambers (PC), each obtained in the area of a respective spark plug (13), where the combustion of a gas mixture comprising fresh air and fuel takes place in order to increase the turbulence inside the main combustion chamber (MC) of the respective cylinder (11);
   the injection system (1) is characterized in that it comprises:
   a number of extraction ducts (17; 28), each originating from a respective cylinder (11) in the area of an extraction point (P) to extract the gas mixture present inside the respective main combustion chamber (MC) during a combustion cycle;
   at least one reserve (18), which receives the gas mixture from the extraction ducts (17; 28); inside the reserve (18), the gas mixture coming from the extraction ducts (17; 28) is mixed with the quantity of fuel needed to obtain a combustion under stoichiometric conditions inside the combustion pre-chambers (PC);

a number of second injectors (27), each coupled to a respective combustion pre-chamber (PC), into which it injects the gas-and-fuel mixture coming from the reserve (18); and an injector system (22), which feeds the fuel to the reserve (18) and is connected, by means of a first duct (23), to a low-pressure pump (8) or, alternatively, to a high-pressure pump (4).

2. The system according to claim 1 and comprising a number of fourth injectors (20), each arranged along a respective extraction duct (17; 28) to extract the gas mixture from the main combustion chamber (MC) of the respective cylinder (11) and feed it to the reserve (18).

3. The system according to claim 2 and comprising a number of filters (21), each arranged along a respective extraction duct (17; 28) and upstream of the fourth injector (20).

4. The system according to claim 2 and comprising a number of pumping devices (29) housed along the extraction duct (17), upstream of the reserve (18) and downstream of the fourth injector (20).

5. The system according to claim 1, wherein each cylinder (11) houses a respective piston (12) and the extraction point (P) is obtained above the top dead centre of the stroke of the piston (12).

6. The system according to claim 1, wherein each cylinder (11) houses a respective piston (12) and the extraction point (P) is obtained under the top dead centre of the stroke of the piston (12).

7. The system according to claim 1 and comprising a number of first control valves (19), each arranged along a respective extraction duct (17) close to the extraction point (P) and designed to regulate the flow of the gas mixture through the extraction duct (17).

8. The system according to claim 1 and comprising a fuel pressure sensor (26) arranged along the first duct (23).

9. The system according to claim 1, wherein the reserve (18) is provided with a temperature and pressure sensor (24) and with a lambda sensor (25) to read the fuel-air equivalence ratio of the gas-and-fuel mixture.

10. The system according to claim 1 and comprising a number of second ducts (28), which feed the gas-and-fuel mixture from the reserve (18) to the respective second injector (27).

11. The system according to claim 10 and comprising a number of pumping devices (29) housed along the second ducts (28).

12. The system according to claim 11 and comprising a pressure sensor (30; 31) for the pressure of the gas-and-fuel mixture, which is housed along the second duct (28) and is interposed between the pumping device (29) and the second injector (27).

13. The system according to claim 11, wherein the second injectors (27) are suited both to inject the gas-and-fuel mixture coming from the reserve (18) into the respective combustion pre-chamber (PC) and to extract the gas mixture from the main combustion chamber (MC) of the respective cylinder (11) and feed it to the reserve (18); and comprising a number of third ducts (33), which feed the gas mixture from the respective main combustion chamber (MC) to the reserve (18).

14. The system according to claim 13 and comprising a number of second control valves (32), which are designed to regulate the passage of the gas-and-fuel mixture through the second duct (28); and a number of third control valves (34), which are designed to regulate the passage of the gas mixture through the third duct (33).

15. A method to control an injection system (1) according to claim 1 and comprising in succession:

a suction step, during which the gas mixture is sucked from the main combustion chamber (MC) of the cylinders (11);

a mixing step, during which the gas mixture coming from the cylinders (11) is mixed with fuel inside the reserve (18);

an injection step, during which the gas-and-fuel mixture is injected into combustion pre-chambers (PC); and an ignition step, during which the spark plug (13) is ignited so as to ignite the gas-and-fuel mixture into combustion pre-chamber (PC).

16. The method according to claim 15, wherein the suction step and/or the injection step and/or the ignition step of the spark plug (13) are limited within angular windows of the complete combustion cycle.

\* \* \* \* \*